(12) United States Patent
Lego et al.

(10) Patent No.: US 7,996,293 B2
(45) Date of Patent: Aug. 9, 2011

(54) METHODS AND SYSTEMS FOR MONITORING, ANALYZING AND REPORTING INFORMATION IN ASSOCIATION WITH COLLATERALIZED FINANCIAL INSTRUMENTS

(75) Inventors: Michael J. Lego, Venetia, PA (US); Katherine Kallet, Pittsburgh, PA (US); Katina Bengtson, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 12/822,550

(22) Filed: Jun. 24, 2010

(65) Prior Publication Data

US 2010/0325065 A1 Dec. 23, 2010

Related U.S. Application Data

(62) Division of application No. 10/300,145, filed on Nov. 20, 2002.

(51) Int. Cl.
*G06Q 40/00* (2006.01)
(52) U.S. Cl. .......................................... 705/35; 705/38
(58) Field of Classification Search .................... 705/35, 705/38
See application file for complete search history.

(56) References Cited

U.S. PATENT DOCUMENTS

| | | | |
|---|---|---|---|
| 4,346,442 A | 8/1982 | Musmanno | |
| 4,989,141 A | 1/1991 | Lyons et al. | |
| 5,093,787 A | 3/1992 | Simmons | |
| 5,412,190 A | 5/1995 | Josephson et al. | |
| 5,649,116 A | 7/1997 | McCoy et al. | |
| 5,696,907 A | 12/1997 | Tom | |
| 5,699,528 A | 12/1997 | Hogan | |
| 5,704,045 A | 12/1997 | King et al. | |
| 5,706,442 A | 1/1998 | Anderson et al. | |
| 5,734,890 A | 3/1998 | Case et al. | |
| 5,761,441 A | 6/1998 | Bennett | |
| 5,793,771 A | 8/1998 | Darland et al. | |
| 5,839,118 A | 11/1998 | Ryan et al. | |
| 5,875,431 A | 2/1999 | Heckman et al. | |
| 5,875,437 A | 2/1999 | Atkins | |
| 5,930,764 A | 7/1999 | Melchione et al. | |
| 5,940,809 A | 8/1999 | Musmanno et al. | |

(Continued)

OTHER PUBLICATIONS

Kirsty Greenwood and Nic Cicutti, "Personal Finance: Switching isn't hard to do: More people divorce than change banks. But it's not that traumatic." *Independent*, Nov. 7, 1998, 5 pages.

(Continued)

*Primary Examiner* — James Kramer
*Assistant Examiner* — Samica L Norman
(74) *Attorney, Agent, or Firm* — Robert J. Pugh; K&L Gates LLP

(57) ABSTRACT

In one method embodiment of the present methods and systems, a computer-assisted method is provided for analyzing at least one financial instrument associated with a financial institution. The financial instrument has an associated collateral. The method includes receiving at least one collateral margin record from a collateral data source, wherein the collateral margin record includes information related to at least one collateral margin condition of the financial instrument; comparing at least a portion of the collateral margin record to at least one criterion; and, generating at least one of a report and a notification based on the step of comparing the collateral margin record to the criterion. Various aspects of the present method embodiments discussed herein can also be provided in accordance with various computer-readable media embodiments and system embodiments.

18 Claims, 17 Drawing Sheets

U.S. PATENT DOCUMENTS

| | | | |
|---|---|---|---|
| 5,991,750 | A | 11/1999 | Watson |
| 6,016,482 | A | 1/2000 | Molinari et al. |
| 6,018,721 | A * | 1/2000 | Aziz et al. ................. 705/36 R |
| 6,018,723 | A | 1/2000 | Siegel et al. |
| 6,049,782 | A | 4/2000 | Gottesman et al. |
| 6,055,505 | A | 4/2000 | Elston |
| 6,078,905 | A | 6/2000 | Pich-leWinter |
| 6,119,103 | A | 9/2000 | Basch et al. |
| 6,119,104 | A | 9/2000 | Brumbelow et al. |
| 6,128,599 | A | 10/2000 | Walker et al. |
| 6,128,603 | A | 10/2000 | Dent et al. |
| 6,138,102 | A | 10/2000 | Hinckley, Jr. |
| 6,161,098 | A | 12/2000 | Wallman |
| 6,182,048 | B1 | 1/2001 | Osborn et al. |
| 6,202,053 | B1 | 3/2001 | Christiansen et al. |
| 6,205,434 | B1 | 3/2001 | Ryan et al. |
| 6,226,624 | B1 | 5/2001 | Watson et al. |
| 6,272,472 | B1 | 8/2001 | Danneels et al. |
| 7,139,730 | B1 * | 11/2006 | Shimko et al. ................. 705/35 |
| 7,729,963 | B1 | 6/2010 | Lego et al. |
| 2001/0034701 | A1 | 10/2001 | Fox et al. |
| 2002/0120587 | A1 | 8/2002 | D'Agostino |
| 2003/0036993 | A1 * | 2/2003 | Parthasarathy ................. 705/38 |
| 2003/0144940 | A1 * | 7/2003 | Kochansky et al. ............ 705/36 |
| 2010/0250422 | A1 | 9/2010 | Lego et al. |

OTHER PUBLICATIONS

Conal Gregory, "It can pay to watch out for those hidden bank charges," *Scotsman*, p. 37, Jan. 23, 1999, 2 pages.

Diana Hancock, James A. Wilcox, David B. Humphrey, "Intraday management of bank reserves: the effects of caps and fees on daylight overdrafts," *Journal of Money, Credit & Banking*, Nov. 1996, v 28, n 4, pp. 870-919, printed from http://www.dialogweb.com/cgi/dwclient?req=1262463962662, Internet site, accessed on Jan. 2, 2010, 26 pages.

U.S. Appl. No. 10/033,593, filed Dec. 28, 2001.
U.S. Appl. No. 11/796,371, filed Apr. 27, 2007.
U.S. Appl. No. 10/300,145, filed Nov. 20, 2002.
Office Action dated Jun. 7, 2007 in U.S. Appl. No. 10/033,593.
Office Action dated Jan. 25, 2008 in U.S. Appl. No. 10/033,593.
Office Action dated Sep. 8, 2008 in U.S. Appl. No. 10/033,593.
Office Action dated Jun. 17, 2009 in U.S. Appl. No. 10/033,593.
Office Action dated Sep. 8, 2009 in U.S. Appl. No. 10/033,593.
Office Action dated May 25, 2010 in U.S. Appl. No. 10/033,593.
Office Communication dated Jun. 17, 2010 in U.S. Appl. No. 10/033,593.
Office Communication dated Aug. 9, 2010 in U.S. Appl. No. 10/033,593.
Office Action dated Nov. 15, 2010 in U.S. Appl. No. 12/774,394.
Office Action dated Jul. 17, 2007 in U.S. Appl. No. 11/796,371.
Office Action dated Apr. 17, 2008 in U.S. Appl. No. 11/796,371.
Office Action dated Jan. 8, 2009 in U.S. Appl. No. 11/796,371.
Office Action dated Nov. 24, 2009 in U.S. Appl. No. 11/796,371.
Notice of Allowance dated Dec. 21, 2010 for U.S. Appl. No. 11/796,371, filed Apr. 27, 2007.
Office Action dated Aug. 7, 2007 in U.S. Appl. No. 10/300,145.
Office Action dated May 8, 2008 in U.S. Appl. No. 10/300,145.
Office Action dated Jan. 13, 2009 in U.S. Appl. No. 10/300,145.
Office Action dated Dec. 22, 2009 in U.S. Appl. No. 10/300,145.
Notice of Allowance dated Oct. 13, 2010 for U.S. Appl. No. 10/300,145, filed Nov. 20, 2002.

* cited by examiner

| COUM DATE | CLIENT NAME | OBLIGOR | UNDER MARGIN | DURATION |
|---|---|---|---|---|
| ▶JOHN CMREP — 308 | | | | |
| ▶010205 | | 1 | $40,245.00 | |
| ▶03/15/2004 | | 1 | $40,245.00 | |
| | ABC COMPANY | 1 | $40,245.00 | |
| ▶MARY CMREP — 310 | | | | 100 |
| ▶0702755 | | 1 | $583,511.00 | |
| ▶03/15/2004 | | 1 | $583,511.00 | |
| | DEF COMPANY | 1 | $583,511.00 | |
| | | 2 | $623,756.00 | 3 |

Edit Doc Print

BANK

Created 07/03    08:34 AM by ACBS Extract      Status: Awaiting acknowledgement

| | | | |
|---|---|---|---|
| Assigned CMR | : | Mary UMRep | |
| ACBS Client Name | | Alex Ann SAR Inc. | |
| To: | | 080187 - PNC Advisors | Segment:    Private Banking |
| | | (1011010187) | |
| From: | | Jason Rep | Recorded |
| | | | Line: |
| Subject: | | Collateral Under Margin | Date: |

| Client Name | Obligor |
|---|---|
| Alex Ann SAR Inc. | 853421 |

Loan Value      $246,143.00  — 404
Margin Value      $0.00  — 406
Under Margin Amount      $246,143.00  — 408

Under Margin Duration      2  — 410

Risk Management Comments:

▶ Acknowledgement Section

Required Acknowledgements         Electronic Signature

Erik Bengtson
PNC Advisors

Actions:

402

412

BANK

Under Margin Views

- Today by Mkt/RM
- Today - Aging
- All
- Resp Due

- Help
- Reports DB
- Feedback

- Exit

| Client Name | Date Overdrawn |
|---|---|
| Bengtson, Erik | |
| Collateral Under Margin | |
| ✗ Alex Ann SAR Inc. | 07/02/200 |
| CredOfficer, Mary | |
| Overdraft | |
| ✓ John's Sporting Goods | 07/02/200 |
| Daylight Overdraft | |
| ✓ John's Sporting Goods | 07/03/200 |
| ACH | |
| ✓ John's Sporting Goods | 07/03/200 |
| James, Kathy | |
| Overdraft | |
| ✓ ABC Corp | 07/02/200 |
| Orissa, Penny | |
| Collateral Under Margin | |
| ✓ Gunnar UP | 07/02/200 |
| RMMgr, Joe | |

FIG. 7

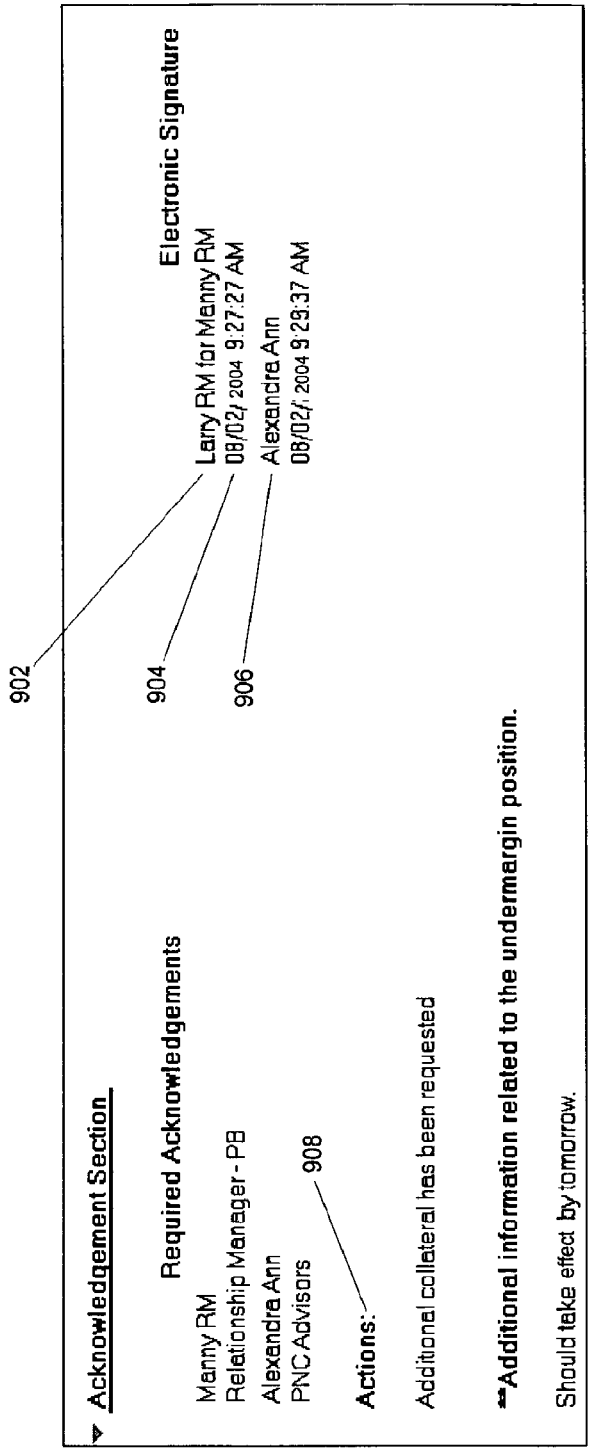

| MKT | CLIENT NAME | |
|---|---|---|
| ▶060 | | |
| | ▶AUTO REVIEWED | 1 |
| | ✓GUNNER UP | 1 |
| ▶080 | | |
| | ▶BENGTSON, ERIK | 1 |
| | ✗ALEX ANN SAR INC. | 1 ACKNOWLEDGMENT ONLY |
| | | 2 |

BANK

TODAY BY MKT/RM
TODAY – AGING
ALL
RESP DUE
HELP
REPORTS DB
FEEDBACK
EXIT

*FIG. 10A*

| OBLIGOR | UNDER MARGIN | LOAN VALUE | MARGIN VALUE | AGE |
|---|---|---|---|---|
|  | $17,000.00 | $200,000.00 | $183,000 |  |
| 12345678 | $17,000.00 | $200,000.00 | $183,000 |  |
|  | $17,000.00 | $200,000.00 | $183,000 | 19 |
|  | $246,143.00 | $246,143.00 | $0 |  |
|  | $246,143.00 | $246,143.00 | $0 |  |
| 853421 | $246,143.00 | $246,143.00 | $0 | 2 |
|  | $263,143.00 | $446,143.00 | $163,000 |  |

FIG. 10B

BANK

UNDER MARGIN VIEWS

| | ☐ EXPORT | | | |
|---|---|---|---|---|
| TODAY BY MKT/RM | | MKT | CLIENT NAME | |
| TODAY - AGING | ▶ AUTO REVIEWED (UNDER $25K) | | | 1 |
| ALL | ▶ 15 DAYS & OVER | | | 1 |
| RESP DUE | ▶ 060 | | ◀ ▶ | 1 COMMENT NOT REQUIRED |
| | ▶ NON ACTIONABLE | | | 1 |
| | ▶ 14 DAYS & UNDER | | | 1 |
| HELP | ▶ 080 | | | ACKNOWLEDGMENT ONLY COMMENT NOT REQUIRED |
| REPORTS DB | | ALEX ANN SAR INC. | | 2 |
| FEEDBACK | | | | |

*FIG. 11A*

| OBLIGOR | UNDER MARGIN | LOAN VALUE | MARGIN VALUE | AC |
|---|---|---|---|---|
| 12345678 | $17,000.00 | $200,000.00 | $183,000 | |
| | $17,000.00 | $200,000.00 | $183,000 | |
| | $17,000.00 | $200,000.00 | $183,000 | |
| | $17,000.00 | $200,000.00 | $183,000 | |
| | $246,143.00 | $246,143.00 | $0 | |
| | $246,143.00 | $246,143.00 | $0 | |
| | $246,143.00 | $246,143.00 | $0 | |
| 853421 | $246,143.00 | $246,143.00 | $0 | |
| | $263,143.00 | $446,143.00 | $183,000 | |

FIG. 11B

| BANK | ACBS OBLIGOR NAME | EXC? | OUTS? | COUM DATE | RM | AGE |
|---|---|---|---|---|---|---|
| UNDER MARGIN VIEWS | ▶ALEX ANN SAR INC. | | | | | |
| | ▶853421 | | X | 07/02/2004 | ERIK BENGTSON | 2 |
| TODAY BY MKT/RM | ▶GUNNAR UP | | | | | |
| | ▶12345678 AUTO REV | | | 07/02/2004 | PENNY DRISSA | 19 |
| TODAY – AGING | ▶JENTA BENTZ | | | | | |
| | ▶31845086 | | X | 06/28/2004 | MANNY RM | 18 |
| ALL | ▶K&B FOLLIES | | | | | |
| RESP DUE | ▶30009249 SEC OUTSIDE F | | | 06/28/2004 | LORI CREDOFF | 428 |
| HELP | | | | | | |
| REPORTS DB | | | | | | |

*FIG. 12A*

| UNDER MARGIN | COMMENTS | | LOAN |
|---|---|---|---|
| $246,143 | ACKNOWLEDGMENT ONLY. COMMENTS NOT REQUIRED | | |
| $17,000 | COMMENTS NOT REQUIRED | | |
| $27,889 | | | |
| $374,195 | COMMENTS NOT REQUIRED | | |

BANK

Under Margin Views

| Today by Mkt/RM |
| Today - Aging |
| All |
| Resp Due |

| Resp Due NLT | RM | AD1 | Client Name |
|---|---|---|---|
| ▼ 07/09/ 2004 | | | |
| | ▼ Awaiting RM acknowledgement | | |
| | Erik Bengtson | | Alex Ann SAR Inc. |
| | ▼ Awaiting RM comments | | |
| | Manny RM | Gina L Holsinger | Jenta Bentz |

METHODS AND SYSTEMS FOR MONITORING, ANALYZING AND REPORTING INFORMATION IN ASSOCIATION WITH COLLATERALIZED FINANCIAL INSTRUMENTS

CROSS REFERENCE TO RELATED APPLICATIONS

This application is a divisional application of co-pending U.S. patent application Ser. No. 10/300,145, filed on Nov. 20, 2002, entitled "METHODS AND SYSTEMS FOR MONITORING, ANALYZING AND REPORTING INFORMATION IN ASSOCIATION WITH COLLATERALIZED FINANCIAL INSTRUMENTS," the entirety of which is incorporated herein by reference.

BACKGROUND

Many financial institutions such as corporate banks, for example, offer a wide variety of financial products and services to their customers. These financial products and services may include one or more types of financial instruments that are suited to meet the diverse needs of the various customers of the financial institution.

One example of a financial instrument offered by a financial institution is a collateralized loan. In general, a collateralized loan permits the customer to borrow funds from the financial institution in exchange for a commitment of collateral by the customer. It can be appreciated that funds may be borrowed through a collateralized loan for a variety of business and/or personal objectives. These objectives often involve a certain amount of risk, depending on the purpose to which the borrowed funds are committed. If the amount of risk associated with a particular objective is relatively high, then it is possible that all or a substantial portion of the borrowed funds may be lost or diminished by the borrower. Furthermore, this loss of funds may adversely impact the ability of the borrower to meet obligations under the terms of the collateralized loan agreement. It can be seen, therefore, that the value of collateral supplied by a loan customer serves to protect the financial institution in the event that the customer cannot meet obligations with respect to repayment of the collateralized loan.

To further mitigate financial exposure in a given transaction, however, the financial institution must consider the volatility of the value of the collateral employed in connection with a financial instrument, such as a collateralized loan. In one illustrative type of collateralized loan, securities (e.g., stocks, bonds, debt instruments, and the like) are provided by the customer to serve as collateral for funds borrowed with the collateralized loan. It can be appreciated that collateral that includes securities possesses a comparatively higher potential for change in value than alternative, comparatively more stable forms of collateral such as real property, for example. As a general principle, securities change value with comparatively higher frequency and potentially greater magnitude, and therefore may be more financially volatile, than other types of more stable collateral.

Thus, loans and other financial instruments executed between a financial institution and its customers in connection with potentially volatile collateral should be appropriately monitored, analyzed and managed. Methods and systems are needed to manage and reduce the risk of such collateral to the financial institution. Improved methods and systems for monitoring, analyzing and reporting information in association with collateralized financial instruments are also needed in the event that customers cannot meet obligations with regard to the financial instruments.

SUMMARY

In one method embodiment of the present methods and systems, a computer-assisted method is provided for analyzing at least one financial instrument associated with a financial institution. The financial instrument has an associated collateral. The method includes receiving at least one collateral margin record from a collateral data source, wherein the collateral margin record includes information related to at least one collateral margin condition of the financial instrument; comparing at least a portion of the collateral margin record to at least one criterion; and, generating at least one of a report and a notification based on the step of comparing the collateral margin record to the criterion. In one optional aspect, the portion of the collateral margin record may include the value of the collateral and the criterion may include a predetermined dollar amount. In another optional aspect, the portion of the collateral margin record may include an indication of a number of days associated with the existence of the collateral margin record and the criterion may include a predetermined number of days. In still another optional aspect, the method may include generating the notification based on the comparing step.

Various aspects of the present method embodiments discussed herein can also be provided in accordance with various computer-readable media embodiments and system embodiments.

BRIEF DESCRIPTION OF THE FIGURES

FIG. 3 is an example of a screen display provided in accordance with an embodiment of a method and system for processing information related to a financial instrument;

FIG. 4A is an example of a screen display provided in accordance with an embodiment of a method and system for processing information related to a financial instrument;

FIG. 7 is an example of a screen display provided in accordance with an embodiment of a method and system for processing information related to a financial instrument;

FIG. 9 is an example of a screen display provided in accordance with an embodiment of a method and system for processing information related to a financial instrument.

FIGS. 10A and 10B collectively show an example of a screen display provided in accordance with an embodiment of a method and system for processing information related to a financial instrument;

FIGS. 11A and 11B collectively show an example of a screen display provided in accordance with an embodiment of a method and system for processing information related to a financial instrument;

FIGS. 12A and 12B collectively show is an example of a screen display provided in accordance with an embodiment of a method and system for processing information related to a financial instrument; and, FIG. 13 is an example of a screen display provided in accordance with an embodiment of a method and system for processing information related to a financial instrument.

DESCRIPTION

Figure 1:
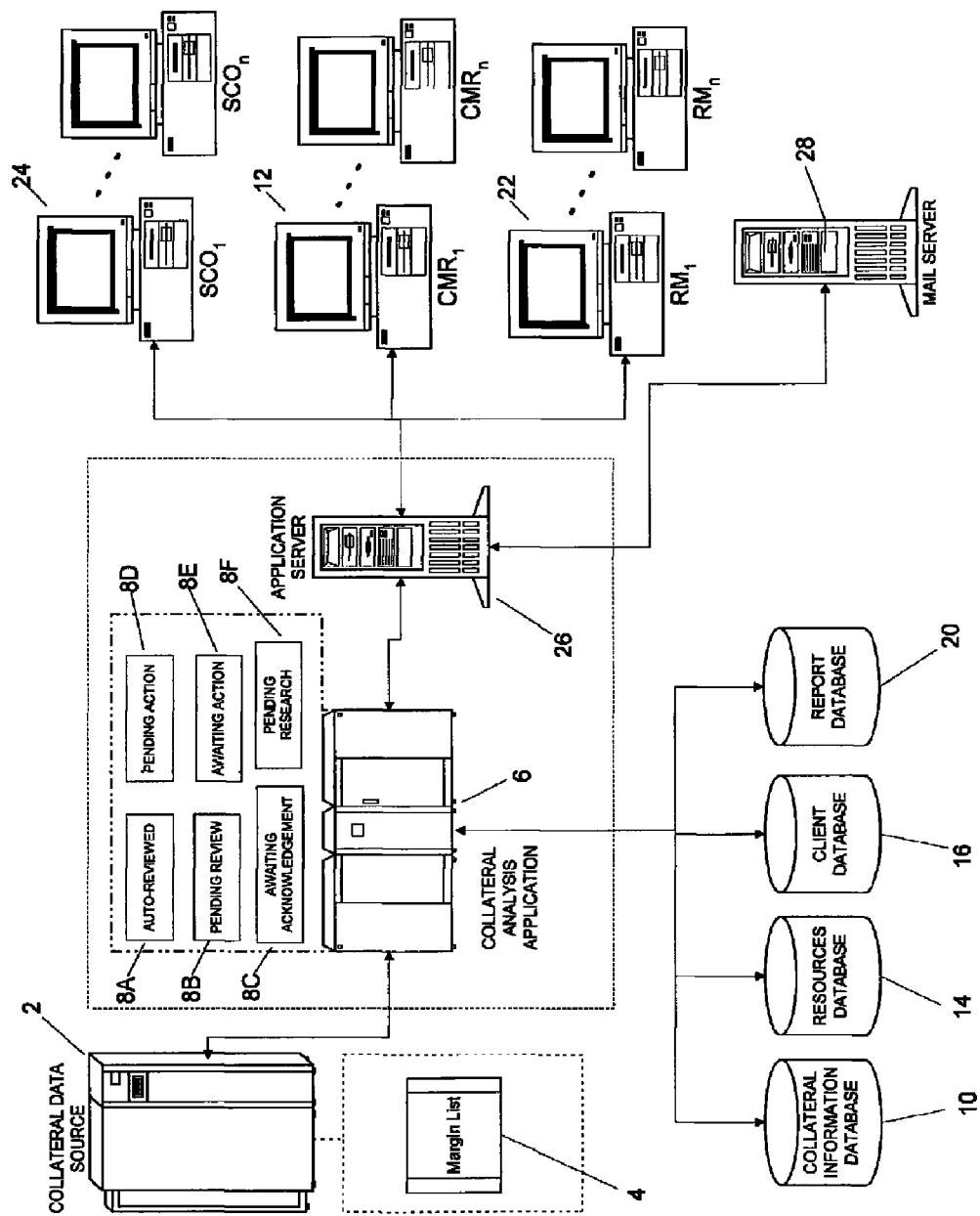
FIG. 1 is a schematic diagram depicting one embodiment of a system for processing information related to one or more financial instruments in a financial institution.

As applied herein, the term "financial instrument" can include, for example and without limitation, a loan, a note, a debt instrument, or another instrument suitable for use in accordance with various aspects of the present methods and systems.

In addition, as applied herein, the term "financial institution" can include, for example and without limitation, privately owned entities that collect and invest funds, government agencies that collect and invest funds, depository financial institutions (e.g., such as commercial banks, savings and loan associations, mutual savings banks, credit unions, and the like), non-depository financial institutions (e.g., such as brokerage firms, life insurance companies, pension funds, investment companies, and the like), or reasonable combinations thereof. An example of a financial institution is a corporate bank that provides its customers with savings accounts, checking accounts, loans, access to investments and various other financial products and services. Customers of such financial institutions may include, for example and without limitation, individuals, corporations, partnerships, limited liability companies, limited liability partnerships or other types of commercial and non-commercial entities capable of using and/or benefiting from the goods and services provided by the financial institution.

As applied to the present methods and systems, the term "collateral" is defined as understood by those skilled in the art. The definition of "collateral" may also include anything of value that is employed in connection with a financial instrument such as a loan, for example. Examples of collateral may include, for example and without limitation, securities, stocks, bonds, real property, intangible property, future interests, and any other item of value that can be used to collateralize a financial instrument.

As applied in connection with the present methods and systems, the term "margin" is generally defined herein as a difference in value based on measurement of value of collateral at a point in time. The term "under margin" is defined herein as the condition in which the value of collateral associated with a financial instrument is less than the value of the funds or other consideration initially provided to a customer through the financial instrument. The term "over margin" is defined herein as the condition in which the value of collateral associated with a financial instrument is more than the value of the funds or other consideration initially provided to a customer through the financial instrument. For example, suppose that proceeds of $50,000 are provided to a customer through a collateralized loan of a financial institution. In addition, suppose that the loan is collateralized with $50,000 worth of common stock of Company A on the first day on which the loan agreement is effective. Thereafter, if the common stock of Company A used to collateralize the loan declines in value to $45,000 (e.g., as a result of market conditions), then an under margin condition of $5,000 can be said to exist for the $50,000 collateralized loan.

In another aspect of the application herein of the "margin" term, the "under margin" term, and/or the "over margin" term, a financial instrument may be partially collateralized (i.e., the value of collateral associated with the financial instrument may be less than the value of the funds or other consideration initially provided to a customer through the financial instrument). In this aspect, the term "under margin" can be defined as the condition in which the present value of collateral associated with a financial instrument is less than the value of collateral initially provided by a customer in connection with a financial instrument. In addition, in this aspect, the term "over margin" can be defined as the condition in which the present value of collateral associated with a financial instrument is more than the value of the collateral initially provided by a customer in connection with the financial instrument.

As applied herein, a "day" can be calculated as understood by those skilled in the art in accordance with practice of the present methods and systems. In various aspects of the present methods and systems, where applicable, a "day" can be defined from the close of a first market trading day to the close of a second market trading day.

In various embodiments discussed herein, the present methods and systems provide for processing and managing information related to the financial condition of one or more financial instruments of a financial institution. In one embodiment, the present methods and systems monitor, process and manage the value of collateral associated with one or more financial instruments issued by the financial institution to one or more of its customers.

Referring now to FIG. 1, in one embodiment of the present methods and systems, data related to one or more accounts of one or more customers of a financial institution are stored in a collateral data source 2. In one aspect, the collateral data source 2 can include a main frame computer, for example, that stores data related to one or more accounts of customers engaged in agreements with the financial institution related to collateralized financial instruments, for example. In general, the collateral data source 2 includes data related to margin collateral conditions (e.g., under margin or over margin collateral conditions) in one or more customer accounts. Data related to customer accounts can be generated and stored in a margin list 4 within the collateral data source 2. In one illustrative embodiment, if a particular loan account possesses an associated collateral value that is more than or less than a fixed dollar amount or a percentage of the value of the original loan proceeds, then data for the loan account may be included on the margin list 4.

In certain embodiments of the present methods and systems, it can be appreciated that the collateral data source 2 may be maintained and administered by a commercial entity that is external to the financial institution. In other aspects of the present methods and systems, the collateral data source 2 is internal to the financial institution that maintains the collateralized financial instruments. For example, the collateral data source 2 may be considered internal to the financial institution in the situation where the financial institution provides direct investment services related to the collateral of a collateralized financial instrument held by a customer.

In general operation of the present methods and systems, a collateral analysis application 6 reads the margin list 4 generated in the collateral data source 2 to generate one or more collateral margin data records, such as records 8A-8F, from the margin list 4. The number of records 8A-8F employed herein is merely for convenience of disclosure and it can be appreciated that any suitable number of records can be used in accordance with the present methods and systems. In one aspect, the margin list 4 can be generated as a conventional text file that is transmitted from the collateral data source 2 to the collateral analysis application 6 via FTP, for example, or another suitable file transfer protocol. As discussed hereinabove, the margin list 4 includes collateral margin data associated with one or more customer accounts, such as collateralized loan accounts, for example. In general, the collateral analysis application 6 translates and loads collateral data from the margin list 4 into a collateral information database 10 that is operatively associated with the collateral analysis application 6. In one aspect, the collateral information database 10 also includes storage for data associated with one or more of the collateral margin data records 8A-8F.

It can be seen that at least some conventional data conversion may be necessary to achieve common nomenclature, database field names, and the like between the collateral data source 2 and the collateral analysis application 6. Such conversion or translation of terminology may be necessitated by the use of an external or partially external collateral data source 2 that is not wholly owned or maintained by the financial institution. In one illustrative embodiment, the collateral data source 2 can be a third-party data source marketed under the "ACBS" trade designation, for example. In another aspect, the third-party data source can be a loan booking and reporting system, for example, and/or a data source associated with a brokerage firm that is considered external to the financial institution. It can be appreciated that any third-party data source suitable for practice of the present methods and systems may be employed in operative association with the collateral data source 2.

In one embodiment of the present methods and systems, the collateral margin records 8A-8F are sorted by the name or other identifying indicia of a collateral margin representative 12 ("CMR"), who is responsible for reviewing, researching and documenting the circumstances of a given collateral margin situation. In one aspect, this assignment of the collateral margin records 8A-8F can be accomplished by requiring that a particular CMR 12 be responsible for a particular characteristic of a given collateral margin situation. Examples of such characteristics can include, for example, a cost center, a lending group, a profit center, and other characteristics of the financial institution in which the customer associated with the collateral margin situation is serviced.

The collateral analysis application 6 can be embodied, for example, as one or more software applications programmed into the trade-designated "LOTUS NOTES" environment. The collateral analysis application 6 can include operative connections to, among other things, a resources database 14, a client database 16, and a report database 20, in addition to the collateral information database 10. In one aspect of the present methods and systems, one or more reports can be generated in the report database 20 as a function of one or more criteria associated with collateral margin conditions and customer accounts.

Figure 2:
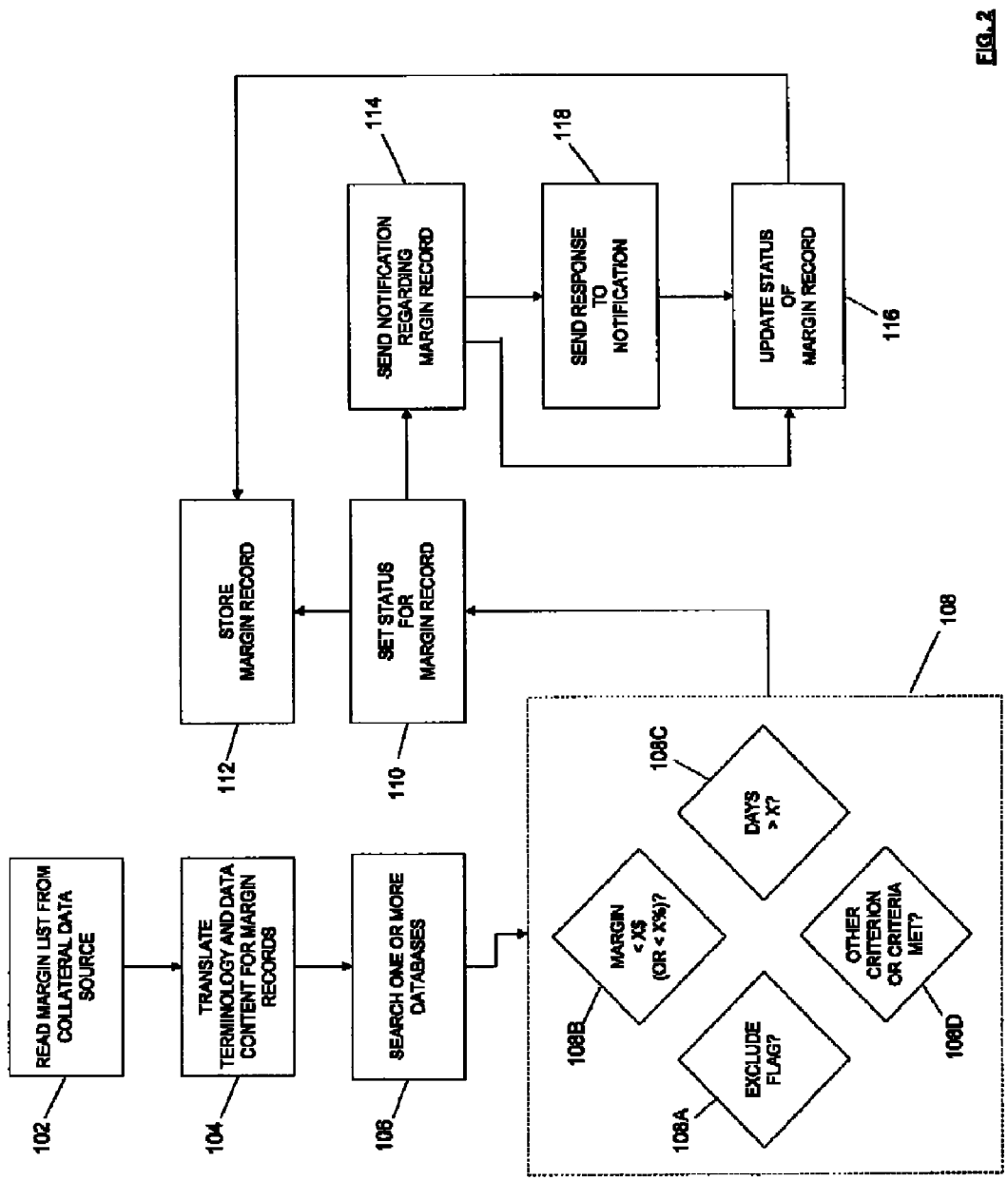
FIG. 2 is a process flow diagram showing one embodiment of a method for processing information related to one or more financial instruments in a financial institution.

Referring now to FIGS. 1 and 2, in another aspect of the present methods and systems, at least a portion (e.g., a line record) of the margin list 4 is read in step 102 by the collateral analysis application 6 to generate one or more of the collateral margin records 8A-8F. For each portion of the margin list 4 that is read, the collateral analysis application 6 may perform one or more of several actions. In step 104, the collateral analysis application 6 may convert bank identifiers, market identifiers, cost center identifiers and other terminology as applied in the margin list 4 to corresponding, equivalent terminology and content (e.g., "Market" and "Cost Center") as used by the collateral analysis application 6.

The collateral analysis application 6 can search in step 106 for one or more pieces of the translated information (e.g., the "Market" and "Cost Center" information) in one or more of the databases 10, 14, 16, 20. For example, the collateral analysis application 6 can search the resources database 14 to return information including a "Cost Center Name" indicia for one or more administrative assistants associated with a particular one of the collateral margin records 8A-8F, and the CMR 12 to be assigned to address the collateral margin situation. In one aspect, the CMR 12 can be assigned based on the "Cost Center" information associated with a particular collateral margin situation. In another example of step 106, the collateral analysis application 6 can search the client database 16 to locate the client or customer name associated with a particular collateralized financial instrument. The collateral analysis application 6 can also obtain information from the client database 16 including, for example, Client DDA Name, Segment, Relationship Manager ("RM") 22 (as used herein an RM can be any member, representative or proxy thereof associated with the financial institution who is assigned to perform certain tasks that involve interaction with the products and services used by a customer of the financial institution), and/or a Senior Credit Officer 24 ("SCO") assigned to the customer (in one aspect, the SCO 24 may be a member of the management of the financial institution who is most directly responsible for issues and interaction with activities of the customer related to collateralized financial instruments). The collateral margin record associated with the collateral margin condition can be updated with one or more pieces of the information obtained from the search of the client database 16.

In various aspects of the present methods and systems, in step 108, each collateral margin record may be reviewed against a certain criterion or criteria. These criteria may include one or more exception flags (see step 108A) that exclude certain types of financial instruments from further consideration by the collateral analysis application 6. Examples of such exception flags include whether or not the collateralized loan is a collared loan, whether or not the collateral used to secure a loan is maintained by an organization which is internal or external to the financial institution, and/or whether the information available for a particular client account is sufficient to permit an analysis to be made by the collateral analysis application 6 (i.e., including situations where additional investigation or research might be required by the CMR 12).

Furthermore, one or more other criteria may be applied to analyze the collateral margin record. In step 108B, in one illustrative application of a criterion, each collateral margin record is checked to determine whether a collateral margin condition exceeds a fixed dollar amount and/or a percentage of the value of the loan proceeds. For example, if an under margin condition for a particular collateral margin record is calculated to be less than $25,000 (or, in another aspect, less than a predetermined percentage of the loan amount), then the initial status can be set to "Auto Reviewed" for the margin record in step 110 and no further acknowledgement or action may be required for the record. The "Auto Reviewed" status may be configured to exclude the particular collateral margin record from further analysis or consideration by the CMR 12 or RM 22, for example. As shown in FIG. 2, margin records and their associated data (such as status information, for example) can be stored for further processing in step 112.

In another example associated with steps 108 and 110, if no exception flag is applied or applicable in step 108A, and the under margin condition is determined in step 108B to be more than $25,000 (or, in another aspect, less than a predetermined percentage of the loan amount), but the under margin condition has existed for less than a predetermined number of days (e.g., a predetermined number of days selected in accordance with the business objectives of the financial institution), as determined by step 108C, for example, then the status can be set to a "Pending Review" status in step 110. The "Pending Review" status can be configured to require an acknowledgement of the existence of the collateral margin record by an RM 22 of the financial institution. As shown in FIG. 2, a variety of other criteria may additionally be applied to each margin record in step 108D.

In one aspect of the present methods and systems, the CMR 12 may review a collateral margin record that is designated with "Pending Review" status and send an appropriate notification in step 114 to the RM 22 associated with the collateral margin condition. In one aspect, the SCO 24 name associated with the customer account may not be displayed in view of application of the criteria of step 108 to the collateral margin record. The sent notification can result in an update to the initial status of the margin record in step 116 to a secondary status of "Awaiting Acknowledgement", until the RM 22 responds in step 118 to the sent notification associated with the collateral margin condition.

In another example associated with steps 108 through 118, if no exception flag is applied in step 108A, and the under margin condition is determined in step 108B to be more than $25,000 (or, in another aspect, less than a predetermined percentage of the loan amount), and the margin condition is determined in step 108C to have existed for more than a predetermined number of days (e.g., a predetermined number of days selected in accordance with the business objectives of the financial institution), then the status can be set to an initial "Pending Action" status in step 110. The "Pending Action" status can be configured to require an acknowledgement of the existence of the collateral margin record as well as an action to address the collateral margin condition by an RM 22 or other representative of the financial institution. In one aspect, the SCO 24 name associated with the customer account may be displayed in view of application of the criteria of step 108 to one of the collateral margin records 8A-8F. In addition, the SCO 24 may be required to acknowledge the existence of the "Pending Action" record.

In one aspect of the present methods and systems, the CMR 12 may review a collateral margin record that is designated with "Pending Action" status and send an appropriate notification in step 114 to the RM 22, the SCO 24, and/or other management representatives for the financial institution. The sent notification may result in an update to the status of the collateral margin record to "Awaiting Action" status in step 116, until the RM 22, the SCO 24, and/or other management representatives respond to the notification in step 118 with acknowledgment and/or a course of action that addresses the collateral margin condition.

It can be appreciated that the process steps described in steps 102 through 118 can be performed iteratively to achieve substantially full processing of the margin list 4 of the collateral data source 2 into one or more collateral margin records 8A-8F. This iterative process can be executed with a frequency that meets the business objectives of the financial institution. For example, in one aspect of the present methods and systems, generating one or more collateral margin records 8A-8F from the margin list 4 may be performed on a daily basis by the financial institution.

In one aspect of the present methods and systems, a client name may not be identifiable in association with a given collateral margin record. In the event that a client name cannot be found, the initial status of the particular one of the collateral margin records 8A-8F can be designated as "Pending Research" and the client name can be shown with a "Client Not Found" designation or equivalent indicia. The CMR 12 can then use a "Get Client" button, for example, and its associated functionality within the collateral analysis application 6 to populate the client name and other information from the client database 16. The status of the collateral margin record can then be set based on satisfaction of any applicable exception values and/or criteria as previously described hereinabove. In another quality control aspect of the present methods and systems, a report can be generated that includes a list of customer accounts which have an associated collateral value of zero. A collateral value of zero for a customer account may be the result of a data entry error, for example, which can be investigated by a CMR 12 once identified on the report.

OPERATIONAL EXAMPLES

Referring now to FIGS. 1 through 3, in one embodiment of the present methods and systems, a CMR performs a conventional login procedure to access the collateral analysis application 6, such as through a conventional application server 26. The illustrative screen display of FIG. 3 shows a collateral margin report (pending view) 302 that can be viewed by a CMR or other officer and which includes collateral margin records 304, 306 generated by interaction of the collateral analysis application 6 with the margin list 4. As shown, each collateral margin record 304, 306 has been associated with a corresponding CMR 308, 310, and the report is sorted by the CMR 308, 310. Each collateral margin record has an associated under margin dollar amount 312 and a number of days (i.e., "duration" 314) that the collateral margin condition has existed. It can be appreciated that collateral margin records that have no acknowledgement or action required (subject to the exception flags and/or criteria described hereinabove) are not shown on this screen, unless the collateral analysis application 6 cannot find a matching client for the record.

It can be appreciated that one or more fields and/or action buttons on a collateral margin report and other sample screen displays discussed hereinafter can be configured to be seen only by a particular CMR or group of CMR's. In one embodiment of the present methods and systems, the configuration of visible and non-visible functionality for a given user of the collateral analysis application 6 is determined by the security level assigned to that particular user within the resources database 14.

In another embodiment of the present methods and systems, a CMR 308, 310 can access one of the collateral margin records 304, 306 of the collateral margin report 302 of FIG. 3 to obtain the illustrative screen display of FIG. 4A. As shown in FIG. 4A, a margin record report 402 can be presented that includes information related to each collateral margin record such as loan value 404, collateral value (i.e., "margin value") 406, under margin amount 408, under margin duration 410, and other information. In addition, once the record 402 is opened, the CMR 310 can perform several actions in connection with the record 402. The CMR 310 can press a "Get Client/Populate" button, for example, for any collateral margin records for which the import functionality of the collateral analysis application 6 could not match the client name on the margin list 4 to the collateral analysis application 6. In one aspect, an RM or CMR may perform research to determine the circumstances and reasons surrounding the cause of the collateral margin condition. It can be appreciated that many conventional human and computer resources can be used to assist in analyzing the collateral margin condition.

Figure 4B:
FIG. 4B is an example of a screen display provided in accordance with an embodiment of a method and system for processing information related to a financial instrument.

In another aspect, the CMR 310 can access an "Edit Doc" feature 412 shown in FIG. 4A to provide the illustrative screen display of FIG. 4B. Any observations or comments regarding the collateral margin condition can be entered in a comments area 414 of the margin record report. In addition, any required acknowledgements (such as acknowledgements that may be made by an RM 22, for example) can be entered as electronic signatures in an "Acknowledgement Section" 416 of the margin record report 402.

Figure 5:
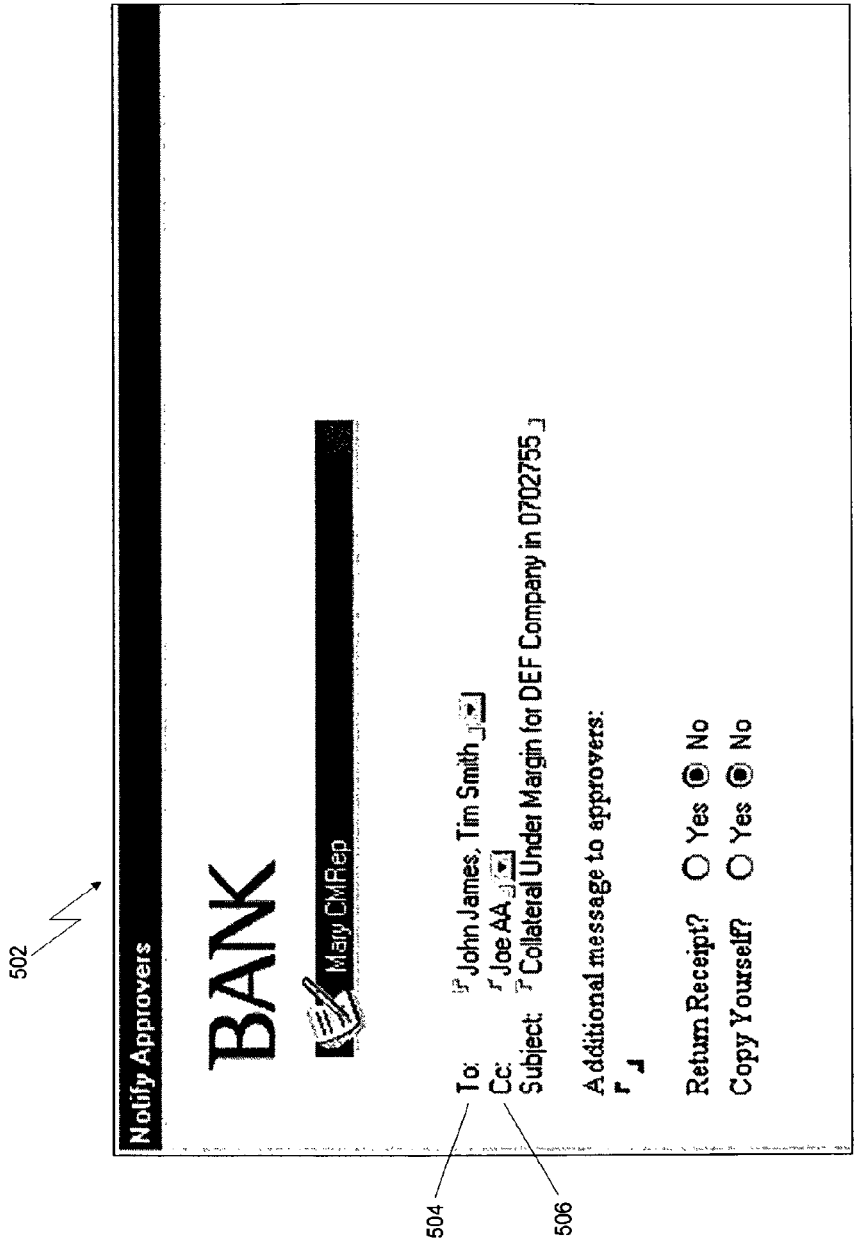
FIG. 5 is an example of a screen display provided in accordance with an embodiment of a method and system for processing information related to a financial instrument.
Figure 6:
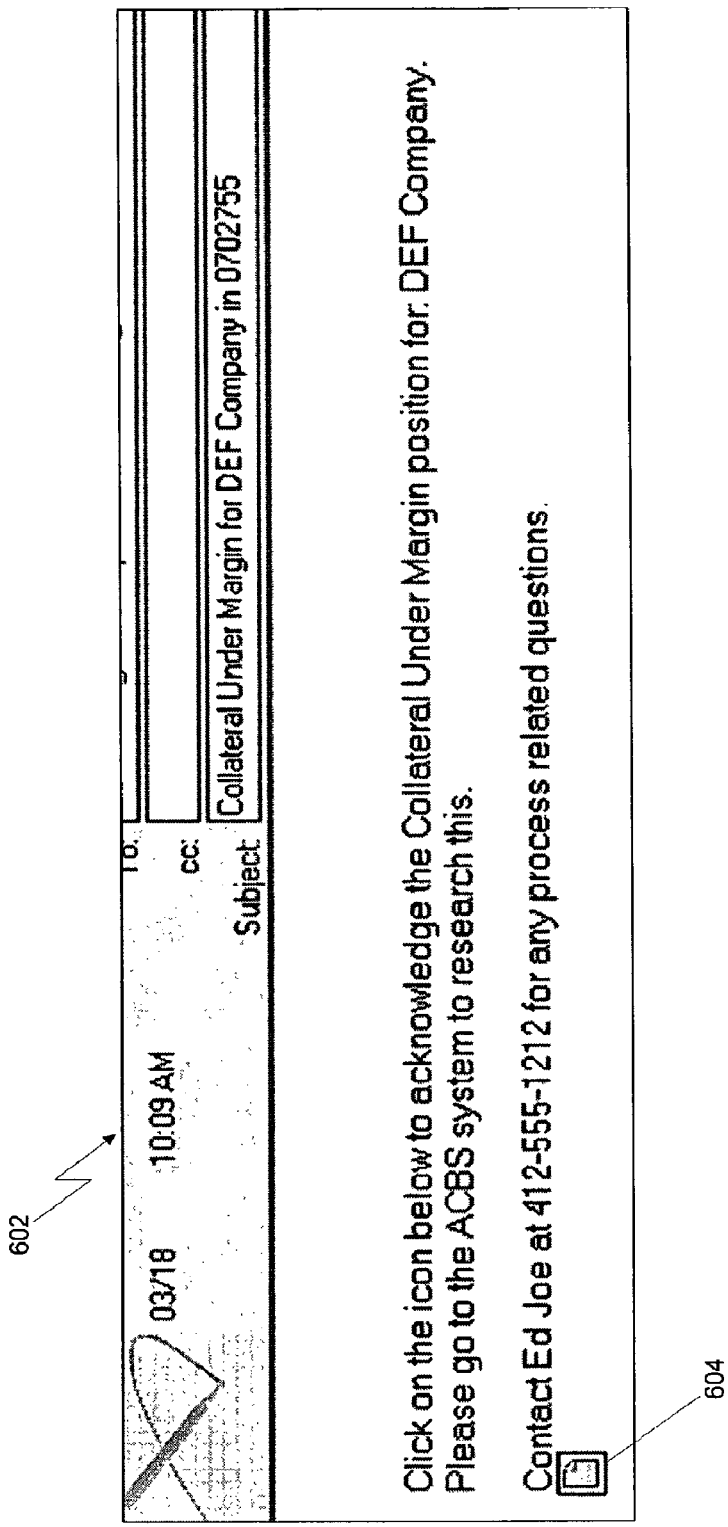
FIG. 6 is an example of a screen display provided in accordance with an embodiment of a method and system for processing information related to a financial instrument.

In one embodiment, a "Notify Approvers" page (shown in FIG. 5) can be presented to the CMR 310 for processing in connection with each collateral margin record. As shown in FIG. 5, the formal notification can be designated by the CMR 310 for delivery to the RM 22 or other officer responsible for the margin record in field 504. In addition, the CMR 310 can designate an administrative assistant or other agent associated with the primary recipient of the formal notification in field 506. As shown in FIG. 6, the formal notification 602 as received and viewed by the recipient can include a link 604 that permits the recipient to access margin record report information (see FIGS. 4A and 4B described hereinabove). In another embodiment, the formal margin notification can be sent substantially automatically to the recipient based on satisfaction of one or more predetermined criteria.

In one illustrative embodiment, formal notification of the collateral margin condition can take the form of an electronic mail sent through a mail server 28 to the RM 22. In various embodiments of the present methods and systems, the RM 22 or SCO 24 can use the link 604 in the received formal notification 602, or can access the collateral analysis application 6 directly, as desired, to acknowledge and/or document actions for various collateral margin conditions. An officer view displaying various margin conditions is shown in the illustrative screen display of FIG. 7. In another embodiment, reports can be generated in the report database 20 based on responses by the RM 22 and other representatives of the financial institution to various formal notifications.

In addition, in another aspect of the present methods and systems, a proxy can be designated and authorized by the RM 22 to act on behalf of the RM 22 under a variety of circumstances such as, for example, in the event of the absence or unavailability of the RM 22. In another aspect, a formal notification that remains unacknowledged for a period of time can be substantially automatically escalated to another management authority within the financial institution. Such escalation may also occur based on exceeding a predetermined time limit after which the collateral margin condition remains in existence without acknowledgement or action by the RM 22. Instructions from the RM 22 or other management authority or agent can include, for example and without limitation, an order to liquidate all or a portion of the collateral associated with a collateralized financial instrument, call the collateralized financial instrument due, submit a request for the customer to supply additional collateral, and other like instructions.

Based on the status assigned to a given collateral margin record, the outstanding margin condition report appears in a list that each RM 22 and/or SCO 24 who is notified by the margin condition report can access through the collateral analysis application 6. As shown in the screen display of FIG. 7, a report of outstanding collateral margin decisions can be generated and displayed for CMR's 12, RM's 22 and/or SCO's 24 that includes, for example, "x" and "✓" (i.e., "check mark") indications on the report. In one aspect, these indications can be color-coded, for example, such that a green check mark reflects an acknowledged margin notification; and a red "x" indicates a formal margin notification awaiting further acknowledgement and/or action.

Figure 8:
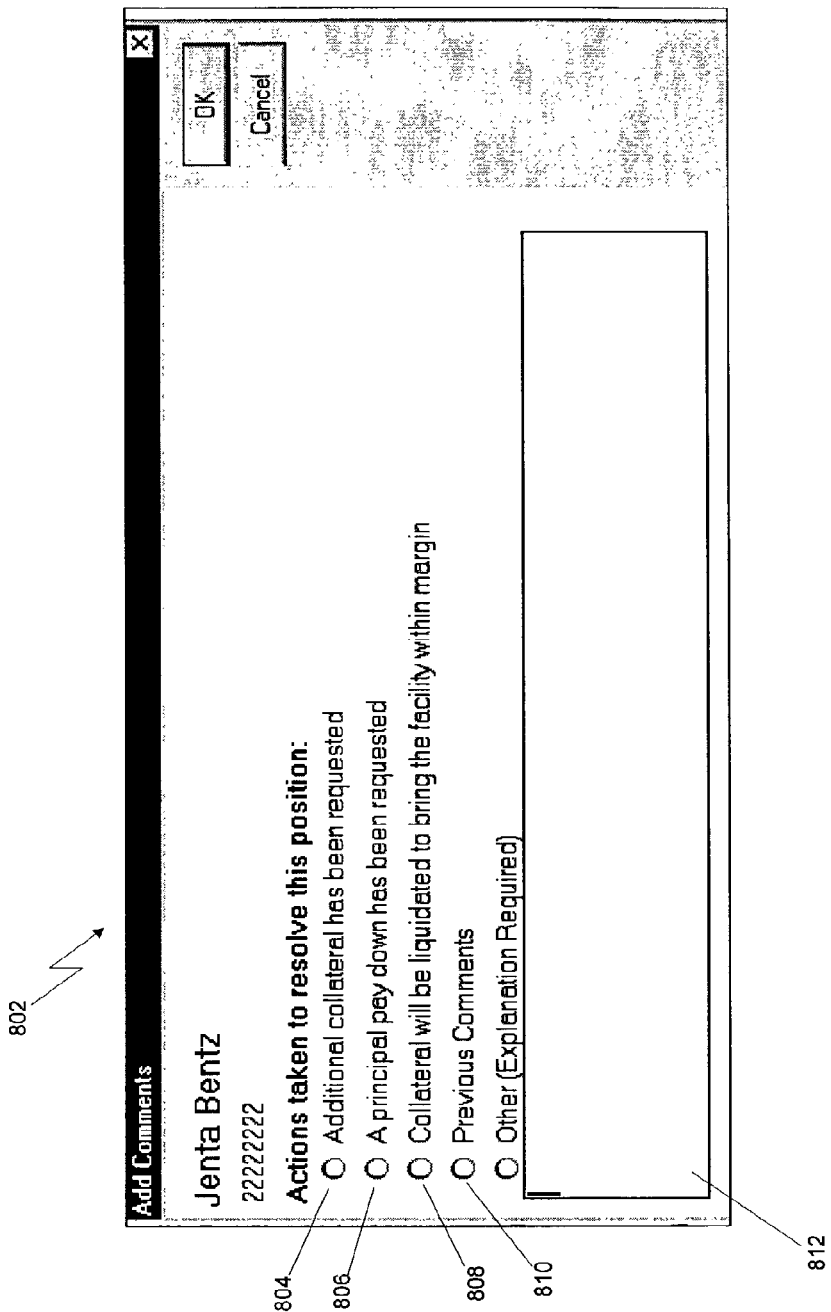
FIG. 8 is an example of a screen display provided in accordance with an embodiment of a method and system for processing information related to a financial instrument.

If action is required based on the status of the collateral margin condition, a dialog box 802 as shown in FIG. 8 can be presented to the RM 22 or other officer. The dialog box 802 requires the RM 22 to select an action that is planned or performed pursuant to resolution of the collateral margin condition. As shown in FIG. 8, illustrative actions that can be selected include "additional collateral has been requested" 804, "a principal pay down has been requested" 806, "collateral will be liquidated to bring the facility within margin" 808, "previous comments" 810, or text can be manually entered in the data entry space 812 provided on the dialog box 802. In one embodiment of the present methods and systems, a history of actions by a given RM 22, by a given customer or by another suitable characteristic can be monitored and reported. In addition, as discussed hereinabove, the SCO 24 associated with a collateral margin condition may be required to acknowledge the existence of the condition.

Referring now to FIG. 9, once the RM 22 accesses and acknowledges the formal notification, and if no comments are required from the RM 22 on further actions to be taken with regard to the collateral margin condition, an electronic signature 902 including a time/date stamp 904 can be provided, for example, to reflect acknowledgement of the RM 22. As shown, the electronic signature 902 may be a designated responsibility that is delegated by the primary RM or other officer to another representative of the financial institution. In addition, an additional electronic signature 906 may be required to acknowledge a margin condition based on any number of factors such as dollar amount, duration of margin condition, or another suitable factor or combination of factors associated with the margin condition. In another aspect, selections made in the screen display of FIG. 8 can be shown in an "Actions" section 908 of the screen display of FIG. 9.

In general, a list that is accessible to the RM 22, the SCO 24, the CMR 12, and/or other appropriate management of the financial institution can display the status of processed and outstanding collateral margin reports. An illustrative embodiment of the list is shown in the illustrative screen display of FIG. 7. In one embodiment, outstanding collateral margin reports remain in the list until updated when the margin list 4 is generated during subsequent execution of the collateral analysis application 6 in operative association with the collateral data source 2.

In one embodiment of the present methods and systems, the comments of the RM with regard to a planned action to address a collateral margin condition can be pursued by the CMR for the collateral margin condition. For example, the CMR may execute a decision by the RM to liquidate the collateral associated with a customer account to mitigate financial loss of assets for the financial institution. In another aspect, the action or actions entered by the RM in the dialog box 802 of FIG. 8, for example, can generate an appropriate transaction that is substantially automatically fed back to the collateral data source 2 to execute the planned action.

In another embodiment of the present methods and systems, a number of views may be available for management of the financial institution who access the collateral analysis application 6. The illustrative screen displays of FIGS. 10 through 13 include sample views that can be provided for monitoring and analyzing collateral margin conditions.

Referring now to FIGS. 10A and 10B, a "View of Under Margins by Mkt/RM" shows under margin conditions sorted by Market designation, and then either by the RM 22 or by an applicable exception flag (e.g., "Auto Reviewed" status).

Referring now to FIGS. 11A and 11B, a "View of Today's Under Margins by Age Category" can be provided. The screen display of FIGS. 11A and 11B collectively display a sample view of under margin conditions for a given day sorted by the status of under margin conditions, a specific dollar amount, a number of days in the under margin condition, and/or the client name.

Referring now to FIGS. 12A and 12B, a "View of All Under Margins" can be provided. The sample view of FIGS. 12A and 12B collectively show under margin conditions sorted by customer and the dates associated with the under margin conditions.

Referring now to FIG. 13, a "View of Responses—Overdue Responses" can be provided. This sample view shows outstanding under margin conditions, including a due date for a response from the RM 22 and the status of each collateral margin condition.

The present methods and systems described herein can also be employed in association with other types of data collection to develop one or more algorithms for assessing risk with a particular customer or a product or service of the financial institution. For example, the present methods and systems can be combined with an assessment of overdraft history for a particular client to provide an overall indication of risks associated with a given customer. Information on factors such as overdraft history and under margin history, for example, can be combined in a reasonable manner, such as part of a risk assessment algorithm. The results of such a risk assessment algorithm can provide a basis for the financial institution to decide whether future involvement with a particular customer is prudent in view of the goods and services provided by the financial institution.

It can be appreciated that access to value information associated with the collateral that supports a given collateralized financial instrument can be obtained from conventional sources such as live data feeds, online data sources, and other sources of financial value information. In one aspect, if stocks, mutual funds, bonds and the like are used for collateral in a collateralized financial instrument, then the collateral data source 2 and/or the collateral analysis application 6 may maintain an operative connection to an Internet site, for example, or other data source that includes quotes for stock prices, for example, at a point in time. For example, the collateral analysis application 6 can include functionality that permits data entry of information related to a particular stock symbol. The collateralized financial instruments of the financial institution can then be sorted, for example, by the selected stock symbol to determine the value of collateral, for example, which is dependent on the value of the particular stock.

The examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention. The configuration and specific functions of a particular screen display, for example, are provided merely for convenience of disclosure.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

The terms "computer" and "computer system" as applied herein may include, without limitation, one or more of the following devices: a wireless personal computer, a laptop, a personal digital assistant (PDA), a wireless pager, a "computer" may be a microcomputer, minicomputer, laptop, personal data assistant, cellular phone, two-way pager, processor, and any other computerized device capable of transmitting, receiving and/or processing data over a shared network.

The term "computer-readable medium" is defined herein as understood by those skilled in the art. It can be appreciated that various method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A computer-assisted method for analyzing at least one financial instrument associated with a financial institution, said financial instrument having collateral associated therewith, said method comprising the steps of:

receiving, using an electronic computing device, at least one collateral margin record from a collateral data source, wherein said collateral margin record includes information related to at least one collateral margin condition of said financial instrument;

comparing, using the electronic computing device, at least a portion of said collateral margin record to at least one criterion;

excluding the collateral margin record from analysis when the collateral associated with the financial instrument is maintained by an organization which is internal to the financial institution;

generating with a collateral analysis application a notification based on said step of comparing said collateral margin record to said criterion;

sorting the collateral margin records by an indicia of collateral margin representative;

excluding the collateral margin representative record from analysis by the collateral margin representative when the collateral margin condition is less than a predetermined dollar amount;

requiring a relationship manager to acknowledge the existence of the collateral margin record when the collateral margin condition is greater than a non-zero predetermined dollar amount;

automatically escalating the notification to another management authority within the financial institution when the notification is unacknowledged for a period of time;

requiring the relationship manager to take an action to address the collateral margin condition when the collateral margin condition is greater than a predetermined dollar amount and has existed for a predetermined number of days; and automatically escalating the notification to another management authority within the financial institution when action is not taken by the relationship manager for a period of time.

2. The method of claim 1, wherein said portion of said collateral margin record includes the value of said collateral and said criterion includes a predetermined dollar amount.

3. The method of claim 2, further comprising generating said notification based on comparing the value of said collateral to said predetermined dollar amount.

4. The method of claim 1, wherein said portion of said collateral margin record includes an indication of a number of days associated with the existence of said collateral margin record and said criterion includes a predetermined number of days.

5. The method of claim 4, further comprising generating said notification based on comparing said predetermined number of days to said indication of a number of days of said collateral margin record.

6. The method of claim 1, further comprising setting a status for said collateral margin record based on said comparing step.

7. The method of claim 6, further comprising updating said status of said collateral margin record.

8. The method of claim 1, further comprising associating the collateral margin representative with a characteristic of at least one collateral margin condition, wherein the characteristic is at least one of a cost center, a lending group or a profit center.

9. The method of claim 1, further comprising requiring a senior credit officer to acknowledge the existence of the collateral margin condition.

10. A non-transitory computer-readable medium including instructions for performing a method for analyzing at least one financial instrument associated with a financial institution, said financial instrument having collateral associated therewith, said method comprising the steps of:

receiving, by an electronic computing device, at least one collateral margin record from a collateral data source, wherein said collateral margin record includes information related to at least one collateral margin condition of said financial instrument;

comparing, using the electronic computing device, at least a portion of said collateral margin record to at least one criterion;

excluding the collateral margin record from analysis when the collateral associated with the financial instrument is maintained by an organization which is internal to the financial institution;

generating with a collateral analysis application a notification based on said step of comparing said collateral margin record to said criterion;

sorting the collateral margin records by an indicia of collateral margin representative;

excluding the collateral margin record from analysis by a collateral margin representative when the collateral margin condition is less than a predetermined dollar amount;

requiring an acknowledgment by a relationship manager of the existence of the collateral margin record when the collateral margin condition is greater than a non-zero predetermined dollar amount;

automatically escalating the notification to another management authority within the financial institution when the notification is unacknowledged for a period of time;

requiring an action to be taken by the relationship manager to address the collateral margin condition when the collateral margin condition is greater than a predetermined dollar amount and has existed for a predetermined number of days.

11. The medium of claim 10, wherein said portion of said collateral margin record includes the value of said collateral and said criterion includes a predetermined dollar amount.

12. The medium of claim 11, further comprising instructions for generating said notification based on comparing the value of said collateral to said predetermined dollar amount.

13. The medium of claim 10, wherein said portion of said collateral margin record includes an indication of a number of days associated with the existence of said collateral margin record and said criterion includes a predetermined number of days.

14. The medium of claim 13, further comprising instructions for generating said notification based on comparing said predetermined number of days to said indication of a number of days of said collateral margin record.

15. The medium of claim 10, further comprising instructions for setting a status for said collateral margin record based on said comparing step.

16. The medium of claim 15, further comprising instructions for updating said status of said collateral margin record.

17. A computer-implemented system for analyzing at least one financial instrument associated with a financial institution, said financial instrument having collateral associated therewith, said system comprising:

a computer system comprising at least one processor; and a storage device comprising computer-readable medium in communication with the processor and storing instructions adapted to be executed by the processor to:

receive at least one collateral margin record from a collateral data source, wherein said collateral margin record includes information related to at least one collateral margin condition of said financial instrument;

compare at least a portion of said collateral margin record to at least one criterion;

exclude the collateral margin record from analysis when the collateral associated with the financial instrument is maintained by an organization which is internal to the financial institution;

generate a notification based on said step of comparing said collateral margin record to said criterion;

sort the collateral margin records by an indicia of collateral margin representative;

exclude the collateral margin record from analysis by a collateral margin representative when the collateral margin condition is less than a predetermined dollar amount;

require an acknowledgement by a relationship manager of the existence of the collateral margin record when the collateral margin condition is greater than a non-zero predetermined dollar amount;

automatically escalate the notification to another management authority within the financial institution when the notification is unacknowledged for a period of time;

require an action to be taken by the relationship manager to address the collateral margin condition when the collateral margin condition is greater than a predetermined dollar amount and has existed for a predetermined number of days;

automatically escalating the notification to another management authority within the financial institution when action is not taken by the relationship manager for a period of time.

18. The system of claim 17, wherein said portion of said collateral margin record includes the value of said collateral and said criterion includes a predetermined dollar amount, and wherein said portion of said collateral margin record includes an indication of a number of days associated with the existence of said collateral margin record and said criterion includes a predetermined number of days.

* * * * *